US012331697B2

(12) United States Patent
Koerner et al.

(10) Patent No.: US 12,331,697 B2
(45) Date of Patent: Jun. 17, 2025

(54) PISTON FOR AN INTERNAL COMBUSTION ENGINE AND METHOD OF MANUFACTURING THE PISTON

(71) Applicant: MAHLE International GmbH, Stuttgart (DE)

(72) Inventors: Stephan Koerner, Loechgau (DE); Daniel Lopez Martinez, Waiblingen (ES)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/757,486

(22) Filed: Jun. 27, 2024

(65) Prior Publication Data

US 2025/0012231 A1 Jan. 9, 2025

(30) Foreign Application Priority Data

Jun. 28, 2023 (DE) ......................... 102023117075.9
May 8, 2024 (DE) ......................... 102024112940.9

(51) Int. Cl.
*F02F 3/00* (2006.01)
*F02F 3/02* (2006.01)
*F02F 3/12* (2006.01)

(52) U.S. Cl.
CPC .............. *F02F 3/02* (2013.01); *F02F 3/0084* (2013.01); *F02F 3/12* (2013.01); *F02F 2200/00* (2013.01)

(58) Field of Classification Search
CPC ...... F02F 3/14; F02F 3/10; C23C 28/04; F16J 1/01; F02B 77/02; C08G 77/04
USPC ...................................................... 123/193.6
See application file for complete search history.

(56) References Cited

U.S. PATENT DOCUMENTS

| | | | | |
|---|---|---|---|---|
| 5,182,318 | A * | 1/1993 | Savin | C09D 163/00 523/216 |
| 5,252,632 | A * | 10/1993 | Savin | C08K 7/20 252/514 |
| 2016/0130716 | A1 | 5/2016 | Nishikawa | |
| 2018/0094603 | A1 | 4/2018 | Taguchi | |
| 2018/0313294 | A1* | 11/2018 | Wagenblast | F02F 3/0084 |
| 2020/0369576 | A1* | 11/2020 | Suzuki | C04B 35/581 |
| 2022/0010141 | A1* | 1/2022 | Koerner | C23C 24/04 |

FOREIGN PATENT DOCUMENTS

| | | | |
|---|---|---|---|
| DE | 102014018693 | A1 | 6/2016 |
| DE | 102017207236 | A1 | 10/2018 |
| DE | 102017207589 | A1 | 11/2018 |
| JP | 2019211047 | A | 12/2019 |
| WO | WO-2018197338 | A1 * | 11/2018 |

* cited by examiner

*Primary Examiner* — Long T Tran
*Assistant Examiner* — James J Kim
(74) *Attorney, Agent, or Firm* — Fishman Stewart PLLC

(57) ABSTRACT

A piston for an internal combustion engine with a piston crown having an outer surface and with a thermal management layer. The thermal management layer contains a functional layer. The functional layer in turn contains a functional layer matrix, wherein the functional layer matrix includes polysiloxane and hollow spheres embedded in the functional layer matrix. The thermal conductivity of the functional layer is in the range of 0.2 to 2 W/(m*K) and the heat penetration coefficient of the functional layer is in the range of 400 to 1200 J/(K*m2*s½).

18 Claims, 2 Drawing Sheets

Figur 2a
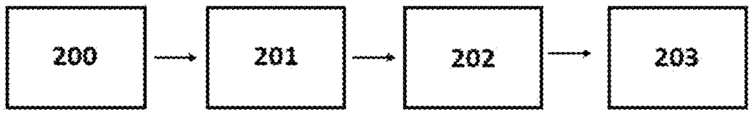
Figur 2b
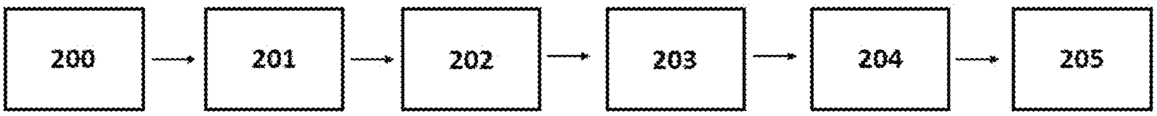

PISTON FOR AN INTERNAL COMBUSTION ENGINE AND METHOD OF MANUFACTURING THE PISTON

CROSS-REFERENCE TO RELATED APPLICATIONS

This application claims priority to German Patent Application No. DE 102024112940.9 filed on May 8, 2024, and to German Patent Application No. DE 102023117075.9 filed on Jun. 28, 2023, the contents of both are hereby incorporated by reference in their entirety.

TECHNICAL FIELD

A piston for an internal combustion engine and a method for applying a functional layer to a piston for an internal combustion engine according to the preamble of the independent patent claims.

BACKGROUND

To improve the temperature resistance of pistons, they are typically provided with a coating on the outer surface of the piston crown. For example, a piston for an internal combustion engine is known from US 2018/0094603 A1, wherein two thermal insulation layers and a protective layer are applied to the piston.

It is a task of the present invention to demonstrate new ways of developing coatings for pistons in order to improve their thermal and/or mechanical properties.

According to the invention, this task is solved by the subject matter of the independent patent claims. Advantageous embodiments are the subject of the dependent patent claims.

According to the invention, the piston for an internal combustion engine, which comprises a piston crown having an outer surface, is provided with a thermal management layer, wherein the thermal management layer contains a functional layer, wherein the functional layer contains a functional layer matrix, wherein the functional layer matrix comprises polysiloxane and hollow spheres embedded in the functional layer matrix, wherein the thermal conductivity of the functional layer is in the range of 0.2 to 2 W/(m*K) and wherein the heat penetration coefficient of the functional layer is in the range of 400 to 1200 $J/(K*m^2*s^{1/2})$.

Alternatively, according to the invention, it is also conceivable for the functional layer to contain a functional layer matrix consisting of polysiloxane and hollow spheres embedded in the functional layer matrix.

In the context of the present invention, the outer surface of the piston crown is the side facing the combustion chamber.

The piston according to the invention with a thermal management layer and the method according to the invention for manufacturing the piston according to the invention with a thermal management layer with the features of the independent patent claims has the significant advantages over the prior art that it improves the efficiency of the combustion process, since heat losses are reduced, disadvantages in terms of volumetric efficiency are avoided and an advantageous thermal swing effect occurs.

This is achieved in particular by avoiding excessive heating in the intake cycle, which prevents a reduction in performance as a result of mass losses. At the same time, heat loss is minimized during the combustion cycle. An advantageous thermal swing effect is achieved in particular by the fact that the functional layer according to the invention is simultaneously designed with a low thermal conductivity and a low specific heat capacity. The heat penetration coefficient of the functional layer according to the invention is in the range of 400 to 1200 $J/(K*m^2*s^{1/2})$. This allows the temperature of the thermal management layer to follow that of the gas with a slight delay.

In the context of the present invention, the heat penetration coefficient b can be defined as the square root of the product of the thermal conductivity, the density and the specific heat capacity.

$$b = \sqrt{\lambda * \rho * c_p}$$

with the thermal conductivity $\lambda$ in W/(m*K),
the density $\rho$ in $kg/m^3$,
and the specific heat capacity $c_p$ in J/(kg*K).

The thermal management layer according to the invention also advantageously prevents excessive heat absorption of the piston, which on the one hand improves the temperature resistance of the piston and on the other hand also enables the use of higher temperatures.

For example, DE10 2017 207 236 A1 discloses a piston for an internal combustion engine with a base body and with a porous thermal insulation layer applied to this base body, in which hollow spheres are embedded, and a cover layer arranged on the thermal insulation layer. A number of platelet-like inorganic particles, in particular mica, are embedded in this top layer, which are intended to reflect heat like a mirror. In contrast, according to the present invention, advantageous thermal properties can be obtained without the need for such an additional reflective layer with mica particles. This also leads to improved mechanical stability of the thermal management layer according to the invention.

Furthermore, it is advantageous that the thermal management layer according to the invention consumes less lubricating oil on the one hand, while at the same time enabling better heat dissipation and extending the service life of the lubricating oil on the other.

One consequence of the advantageous effect that less heat is absorbed via the piston and has to be dissipated via the cooling circuit is that the exhaust gas temperature is increased. If required, this can be used advantageously to increase the efficiency of the turbocharger or to use the heat to convert it into electrical energy (waste heat recovery).

In the following, the piston according to the invention for an internal combustion engine with a thermal management layer, wherein the thermal management layer contains a functional layer, and the method according to the invention for applying a thermal management layer containing a functional layer to a piston for an internal combustion engine are explained in more detail, wherein the [sic] FIG. 1 used in the context of the explanation of the piston for an internal combustion engine according to the invention and in this context also [sic] apply analogously to the method for applying a functional layer to a piston for an internal combustion engine and the FIGS. 2*a* and 2*b* used in this context and vice versa.

According to the invention, the piston for an internal combustion engine is provided with a thermal management layer. The piston comprises a piston crown with an outer surface. The thermal management layer contains at least one functional layer. The thermal management layer serves to prevent, as far as possible, excessive heat absorption by the piston due to the penetration of heat from the combustion chamber of the internal combustion engine. This reduces heat loss in the combustion cycle and protects the piston material. This is achieved by the functional layer, wherein the thermal conductivity of the functional layer is in the range of 0.2 to 2 W/(m*K). Furthermore, the heat penetration coefficient of the functional layer (5) is in the range of 400 to 1200 $J/(K*m^2*s^{1/2})$. To achieve these properties, the functional layer has a polysiloxane embedded with hollow spheres as a matrix material. The determination of the thermal conductivity and the heat penetration coefficient is preferably carried out at 25° C.

It goes without saying that the invention is fundamentally applicable to all conceivable pistons for internal combustion engines. It also goes without saying that all conceivable configurations of the piston crown are conceivable according to the invention.

The outer surface of the piston is preferably arranged on the end face of the piston crown. The functional layer of the thermal management layer is in contact with the outer surface of the piston crown. The functional layer contains a polysiloxane and hollow spheres.

A polysiloxane is understood to be a silicon-based polymer which can, for example, correspond to the following rough schematic formula 1:

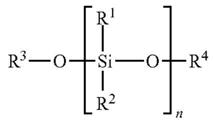

Different chain lengths n are conceivable here, as are different branches, which are not shown in the exemplary formula 1. This can also include three-dimensional cross-linked cage structures. The radicals $R^1$, $R^2$, $R^3$, and $R^4$ can each be selected independently of one another, for example from the group consisting of hydrogen, alkyl, aryl, halogen, hydroxyl, and alkoxy. It is also conceivable for the residues $R^1$ and $R^2$ to differ in the various repeat units. It is also conceivable for the radicals selected from the group consisting of alkyl, aryl, and alkoxy to be unsubstituted. It is also conceivable for these residues to in turn be mono- or polysubstituted with a further substituent. For example, it is conceivable for such radicals to in turn be substituted with a substituent from the group consisting of alkyl, aryl, halogen, hydroxyl, and amino.

Alkyl groups are known to the person skilled in the art. Examples of alkyl groups are the methyl group $—CH_3$, the ethyl group $—CH_2—CH_3$ or the n-propyl group $—CH_2—CH_2—CH_3$. Alkyl groups can be linear or branched.

Aryl groups are known to the person skilled in the art. Examples of aryl groups are phenyl or 1-naphthyl.

Alkoxy groups are also known to the person skilled in the art. This refers to an alkyl group connected to an oxygen atom. Examples of alkoxy groups are the methoxy group $—OCH_3$ or the ethoxy group $—O—CH_2—CH_3$.

Amino groups are also known to the person skilled in the art. A primary amino group is understood here to be the residue $—NH_2$. Furthermore, there are also secondary $—NHR^5$ and tertiary amino groups $—NR^5R^6$, wherein the residues $R^5$ and $R^6$ can in turn be identical or different alkyl groups, for example.

According to the invention, a silicone-based resin composition is used which contains at least one polysiloxane as the main component.

Typically, an air-curing polysiloxane resin coating is used. In addition to the polysiloxane resin to be cured, this also contains other components such as at least one solvent and pigments. For example, the polysiloxane resin coating may contain 15 to 70 mol % p-chlorobenzotrifluoride, 20 to 45 mol % polysiloxane resin to be cured, 15 to 35 mol % ceramic and/or metallic pigments, 0 to 10 mol % $TiO_2$ and 0 to 2 mol % carbon black. It goes without saying that the sum of all components contained must be 100 mol %. Typically, according to the invention, $TiO_2$, $ZrO_2$, and $WO_3$ are preferably included.

Preferably, hollow spheres made of ceramic, glass, or pure $SiO_2$ can be used as hollow spheres. Such hollow spheres may have a geometry that deviates slightly from the ideal sphere due to the manufacturing process. For example, the hollow spheres can be made of pure, amorphous, transparent $SiO_2$. Alternatively, the hollow spheres can be formed from at least one of the materials selected from the group of $SiO_2$, $ZnO_2$, CaO, $Al_2O_3$, $Na_2O$, $Cr_2O_3$, aluminosilicates, MgO, BaO, TiO2, $ZrO_2$, MnO, $Fe_2O_3$, and $B_2O_3$. For example, 3M™ Glass Bubbles IM16K with a density of 0.46 $g/cm^3$ can be used as hollow spheres.

Furthermore, it is preferred for the piston to comprise a piston material with an aluminum alloy or an iron alloy and for the thermal management layer to be arranged at least in some areas on the outer surface of the piston crown.

In particular, it is preferred for the piston to comprise a piston material with an iron alloy and for the thermal management layer to be arranged at least in some areas on the outer surface of the piston crown.

As already mentioned, the outer surface of the piston crown is the side facing the combustion chamber.

Furthermore, it has proven to be advantageous for the polysiloxane to exhibit a temperature resistance of up to at least 500° C., preferably for the polysiloxane to exhibit a temperature resistance of up to at least 650° C.

In an advantageous development of the piston, the proportion of hollow spheres, in relation to the total volume of the functional layer, is 5 to 40% by volume, preferably the proportion of hollow spheres in relation to the total volume of the functional layer is 10 to 20% by volume, more preferably the proportion of hollow spheres in relation to the total volume of the functional layer is 11 to 16% by volume.

Furthermore, it has proven to be advantageous if hollow spheres are embedded in the functional layer in the form of filler material. This increases the heat-insulating effect of the functional layer. The hollow spheres are advantageously made of SiO2. Alternatively, the hollow spheres are advantageously made of soda-lime borosilicate glass.

Furthermore, in the context of the present invention, it is advantageous if the hollow spheres have a diameter $d_{50}$ of 5 μm to 50 μm, preferably the hollow spheres have a diameter $d_{50}$ of 15 μm to 25 μm, more preferably the hollow spheres have a diameter $d_{50}$ of 19 μm to 21 μm.

The diameter value $d_{50}$ indicates the particle diameter below which 50% of all particles can be found. Conversely, this also means that 50% of all particles have a larger particle diameter. Typically, the diameters of such hollow spheres are determined using laser diffraction or automated statistical imaging.

Furthermore, it has proven to be advantageous if the functional layer contains $TiO_2$, $ZrO_2$, and $WO_3$. Such a functional layer has particularly good thermal resistance.

Typically, functional matrices from the commercially available Cerakote® V series are suitable for the functional layer; in particular the use of Cerakote® V-136 has proven to be advantageous.

Furthermore, it has proven to be advantageous for the thermal conductivity of the functional layer to be in the range of 0.2 to 1.8 W/(m*K), more advantageous for the thermal conductivity of the functional layer to be in the range of 0.3 to 0.4 W/(m*K). As mentioned above, the determination of the thermal conductivity is preferably carried out at 25° C.

Thermal conductivity can be measured using the laser flash method or the 3-omega method, for example. In the laser flash method, a heating pulse is applied to the sample using laser radiation and the thermal radiation on the side of the sample opposite the laser is measured using an IR detector. In the 3-omega method, a heating line sputtered onto the material is heated with a periodic current and the material response is measured in the form of a periodic voltage.

In addition, it is advantageous for the heat penetration coefficient of the functional layer to be in the range of 500 to 900 J/(K*$m^2$*$s^{1/2}$), more advantageous for the heat penetration coefficient of the functional layer to be in the range of 600 to 760 J/(K*$m^2$*$s^{1/2}$). As mentioned above, the determination of the heat penetration coefficient is carried out preferably at 25° C.

Furthermore, it is intended for the specific heat capacity of the functional layer to be in the range 450 to 1000 J/(kg*K). Preferably, the determination of the specific heat capacity is carried out at 25° C.

The specific heat capacity can be measured using differential scanning calorimetry (DSC), for example. The determination of the heat penetration coefficient is carried out by calculation according to the above formula.

In particular, the aforementioned thermal properties achieve an advantageous thermal swing effect.

Furthermore, it has proven to be advantageous for the functional layer to have a thickness of 50 to 250 μm, preferably 80 to 110 μm, measured perpendicular to the outer surface of the piston crown.

Alternatively, it has proven advantageous for the functional layer to have a thickness of 50 to 110 μm, measured perpendicular to the outer surface of the piston crown.

Simulations have shown that for a specified heat penetration coefficient, increasing the thickness of the functional layer to values of up to around 100 μm initially results in a significant improvement in the thermal swing effect and the temperature curves in the engine. By increasing the thickness of the functional layer to over 110 μm, no further significant improvement can be achieved in the simulation. In addition, investigations were carried out on various samples with different thicknesses of the functional layer using scanning electron microscopy. These investigations have shown that thicker coatings, especially those thicker than 150 μm, are more susceptible to adhesion problems and flaking of the coating. Layer thicknesses ≤110 μm have proven to be significantly more robust in this context. Thus, a thickness of the functional layer of 50 to 110 μm, and in particular 80 to 110 μm, measured perpendicular to the outer surface of the piston crown, is an advantageous range in terms of both a good thermal swing effect, and good mechanical stability of the functional layer.

Typically, such layer thicknesses can be determined by creating a cross-section, thus creating a cross-sectional preparation and subsequent evaluation on the microscope. It is also possible to carry out a non-destructive measurement using XRF spectrometry. For a quick approximate estimation of the applied layer thicknesses, it has also proven to be advantageous to carry out a determination of the amount of material applied by differential weighing and to set the amount of coating applied in relation to the coated area.

Furthermore, it has proven to be advantageous for the functional layer to have a thickness of 50 to 110 μm, measured perpendicular to the outer surface of the piston crown, and the heat penetration coefficient of the functional layer to be in the range of 500 to 900 J/(K*$m^2$*$s^{1/2}$).

For functional layers with heat penetration coefficients below 500 J/(K*m2*s½), it was found that the temperature on the piston surfaces is relatively high during operation, which has a negative impact on various engine components in terms of strength and thermal stability, such as for example on pistons, valves and cylinder heads.

With regard to the embedding of hollow spheres, it goes without saying that the selected diameters $d_{50}$ for the hollow spheres are smaller than the selected layer thickness in order to enable the hollow spheres to be embedded in the functional matrix in a meaningful way.

It has proven particularly advantageous for the functional layer to have a thickness of 50 to 110 μm, measured perpendicular to the outer surface of the piston crown, and for the heat penetration coefficient of the functional layer to be in the range of 500 to 900 J/(K*$m^2$*$s^{1/2}$), and for the hollow spheres to have a diameter $d_{50}$ of 15 to 25 μm.

Advantageously, the thermal management layer further comprises a cover layer, wherein the cover layer is attached to the functional layer facing away from the piston crown, wherein the cover layer comprises or consists of a polysiloxane.

Preferably, this top layer is temperature-resistant up to at least 650° C. Such a top layer protects the functional layer advantageously against mechanical, thermal and/or chemical influences.

It has also proven to be advantageous if the top layer has a thickness of 4 to 20 μm, preferably 4.5 to 5.5 μm, measured perpendicular to the outer surface of the piston crown.

It has also proven particularly advantageous for the top layer to be non-porous or closed-porous, such that the top layer covers the functional layer as far as possible in a gas-impermeable manner. This provides particularly good protection for the functional layer.

Advantageously, the surface roughness Ra of the thermal management layer is in the range of <2 μm. This prevents turbulence of the combustion mixture as far as possible.

The surface roughness Ra is the average roughness value, which is standardized according to DIN EN ISO 4287:2010.

Typically, the surface roughness Ra is determined by scanning the surface over a defined measuring distance and recording all differences in height and depth. The definite integral of this profile course on the measuring section is then determined and divided by the length of the measuring section.

The invention also relates to a method of manufacturing a piston, wherein a thermal management layer containing a functional layer is applied to a piston for an internal combustion engine, comprising the steps of:

a) cleaning and optional roughening of the area of the piston to which the functional coating is to be applied,
b) introduction and dispersion of hollow spheres into a polysiloxane resin coating to obtain a suspension(S),
c) application of the suspension(S) to the piston by atmospheric spraying,
d) curing of the suspension(S) applied in step c), to obtain a functional layer,
e) optionally following step d), application of a second layer by atmospheric spraying of a polysiloxane resin coating onto the functional layer, f) following step e) curing of the second layer to obtain a top layer.

In step a), the surface to be coated is first thoroughly cleaned before the suspension(S) is applied. Typically, this cleaning is carried out with acetone, tert-butyl acetate, or comparable solvents or solvent mixtures. Cleaning in an ultrasonic bath is also conceivable. It is then optionally possible to heat the piston to around 50 to 150° C. This will remove any solvent residue that may have adhered. Roughening the surface can also be useful. This can be done by sandblasting, for example. It can also be useful to cover areas that are not to be coated before the coating is subsequently applied.

In step b), the desired quantity of hollow spheres is then introduced into a polysiloxane resin coating, whereby a suspension(S) is obtained. In addition to the polysiloxane resin to be cured, the polysiloxane resin coating typically contains other components, such as at least one solvent and pigments. For example, the polysiloxane resin coating contains 15 to 70 mol % p-chlorobenzotrifluoride, 20 to 45 mol % polysiloxane resin to be cured, 15 to 35 mol % ceramic and/or metallic pigments, 0 to 10 mol % $TiO_2$ and 0 to 2 mol % carbon black. Typically, according to the invention, $TiO_2$, $ZrO_2$, and $WO_3$ are preferably included. This suspension(S) is applied to the piston by atmospheric spraying in step c). Atmospheric spraying is a spraying process in which a liquid or molten material is sprayed onto a substrate atmospheric pressure, typically in air. For the present invention, spraying is typically carried out at 1 to 2 bar.

Following the application of the suspension(S) in step c), the resulting layer is cured in step d). For this purpose, the piston is typically left at room temperature for about 15 minutes and then heated to 150° C. and kept at 150° C. for about 1 hour. The piston is then cooled down to room temperature.

After curing of the applied suspension(S) to obtain a functional layer in step d), it is conceivable for a further layer to be applied by atmospheric spraying of a polysiloxane resin coating. No hollow particles are introduced into the polysiloxane resin coating to produce the second layer. The same applies to the polysiloxane resin coating. This second layer is also cured after application. For this purpose, the piston is typically left at room temperature for about 15 minutes and then heated to 150° C. and kept at 150° C. for about 1 hour. The piston is then cooled down to room temperature.

Further important features and advantages of the invention can be seen from the sub-claims, from the drawing and the associated description of the figures and from the examples.

It goes without saying that the above-mentioned features and those to be explained below can be used not only in the combination indicated in each case, but also in other combinations or on their own, without going beyond the scope of the present invention.

BRIEF DESCRIPTION OF THE DRAWINGS

FIG. 2*a*: Flow diagram of the method according to the invention

FIG. 2*b*: Flow diagram of an advantageous further development of the method according to the invention

DETAILED DESCRIPTION

Figure 1:
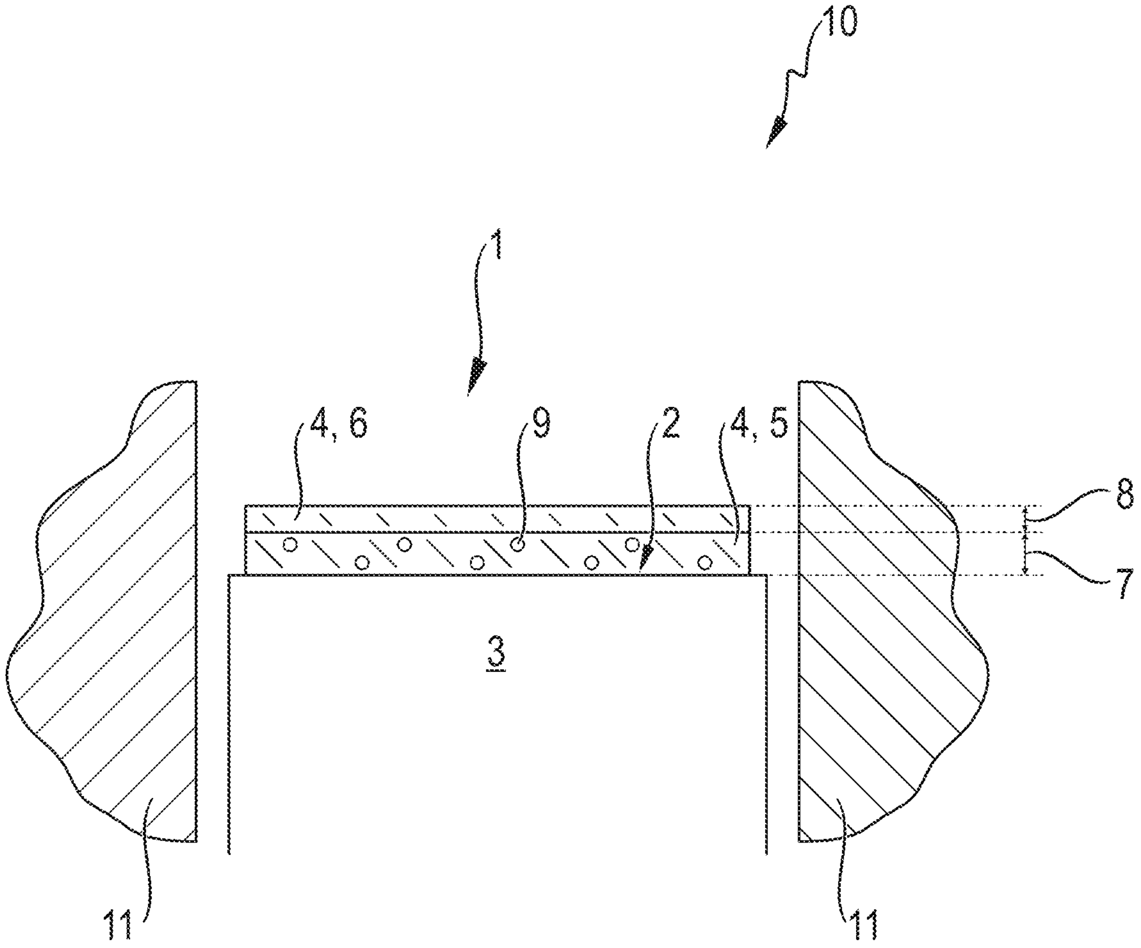
FIG. 1: Rough schematic representation of an example of an internal combustion engine, which can be used in a motor vehicle, for example.

FIG. 1 shows an example of an embodiment of an internal combustion engine 10 according to the invention. The internal combustion engine comprises a cylinder 11. In the cylinder 11 of the internal combustion engine 10, the piston 1 according to the invention is shown as an example and roughly schematically. Piston 1 partially delimits a combustion chamber of the internal combustion engine 10 with an outer surface 2 of the piston 1, for example on the end face, together with the cylinder 11. FIG. 1 shows a piston 1 with a piston crown 3, which has an outer surface 2. In addition, the piston 1 comprises a thermal management layer 4. This is arranged at least in some areas on the outer surface 2 of the piston crown. FIG. 1 shows one aspect of the invention, in which the thermal management layer 4 comprises a functional layer 5 and a cover layer 6. The functional layer 5 is arranged in contact with the outer surface 2 of the piston crown 3 between the piston crown 3 and the cover layer 6. According to the invention, it is also conceivable for the thermal management layer 4 to comprise only a functional layer 5, but no cover layer 6, which is not shown in FIG. 1. The functional layer 5 comprises a functional layer matrix made of polysiloxane and hollow spheres 9 embedded in the functional layer matrix.

As can also be seen in FIG. 1, the functional layer 5 has a thickness 7 measured perpendicular to the outer surface 2 of the piston crown 3. According to the invention, the thickness 7 of the functional layer 5 is from 50 to 250 μm, preferably from 80 to 110 μm. Alternatively, the thickness 7 of the functional layer 5 is preferably 50 to 110 μm.

The cover layer 6 has a thickness 8 of the cover layer 6 measured perpendicular to the outer surface 2 of the piston crown 3. According to the invention, the thickness 8 of the covering layer 6 is 4 to 20 μm, preferably 4.5 to 5.5 μm, measured perpendicular to the outer surface of the piston head. The functional layer 5 comprises hollow spheres 9. It goes without saying that such hollow spheres may have a geometry that deviates slightly from the ideal sphere due to the manufacturing process. The hollow spheres preferably comprise or consist of $SiO_2$.

Alternatively, the hollow spheres are advantageously made of soda-lime borosilicate glass. According to the invention, the functional layer 5 is preferably temperature-stable up to at least 500° C., more preferably up to at least 650° C. The top layer 6, also shown in FIG. 1, is preferably non-porous or closed-porous, according to the invention. This means that the top layer 6 preferably has no pores or only closed pores. This protects the underlying functional layer 5 from the gases in the combustion chamber. It is also provided according to the invention that the top layer 6 is preferably temperature-stable up to at least 500° C., more preferably up to at least 650° C.

According to the invention, the piston crown 3 shown in FIG. 1 comprises, for example, a piston material made of an aluminum alloy or consists of a piston material with such an aluminum alloy. Alternatively, the piston crown 3 comprises a piston material with an iron alloy or consists of a piston material with such an iron alloy.

In process step 200, FIG. 2*a* shows the cleaning and optional roughening of the area of the piston 1 to which the functional layer is subsequently to be applied after cleaning and optional roughening. This is followed by process step 201, in which hollow spheres 9 are introduced into a polysiloxane resin coating and dispersed. A suspension is obtained as a result. In the subsequent process step 202, the previously obtained suspension is applied to the piston 1 by atmospheric spraying. This is followed by process step 203, in which the previously applied layer of suspension is cured. This creates a functional layer 5.

FIG. 2*b* also initially shows the process steps 200 to 203 already explained in FIG. 2*a*. However, in the advantageous further development of the invention shown in FIG. 2*b*, process step 203 is followed by a further process step 204. In process step 204, a second layer is applied to the resulting functional layer 5 by atmospheric spraying of a polysiloxane resin coating. This second layer is cured in the subsequent process step 205, whereby a top layer 6 is obtained.

In the following, the invention is described in detail by means of examples, without limiting the scope of the invention to this:

Materials Used:

Cerakote® V-136

3M™ Glass Bubbles IM16K

Inventive Example EB1a 21 g of 3M™ Glass Bubbles IM16K hollow spheres, corresponding to 14% by volume, are dispersed in 400 g of Cerakote® V-136. The piston, consisting of an aluminum alloy with a previously cleaned surface to be coated, is then preheated to 80° C. for 30 minutes. The suspension is applied with a spray gun at a pressure of 1 bar from a distance of 17.5 cm. A total of 10 clicks are emitted from the spray gun. The piston is then cured for 1 hour at 150° C. A layer thickness of 80 to 110 μm is obtained, measured non-destructively using XRF spectrometry. A crack-free surface is obtained. The specification 80 to 110 μm means that the layer thickness obtained is at least 80 μm at the thinnest point and a maximum of 110 μm at the thickest point.

Inventive Example EB1b

The pistons coated according to example EB1a were tested in the engine test for 250 hours in continuous operation. Visual inspection of the coating before and after the engine test revealed no changes; the coating adhered stably.

Inventive Example EB1c

To investigate the thermophysical parameters of the material, 21 g 3M™ Glass Bubbles IM16K hollow spheres were dispersed in 400 g Cerakote® V-136, corresponding to 14% by volume. Subsequently, aluminum foils with previously cleaned surfaces were preheated to 80° C. for 30 min. The suspension is applied using a spray gun. The material including the aluminum foil is then cured for 1 hour at 150° C. and then scraped off the aluminum foil. Layers of about 5 mm thickness and about 12.9 mm diameter were obtained. These layers were then adjusted by hand grinding to a thickness of approximately 2.4 mm and a diameter of approximately 12.7 mm.

The thermal diffusivity a [$mm^2$/s] was determined by the laser flash method using a NETZSCH LFA 467 Hyperflash® apparatus.

Furthermore, a determination of the specific heat capacity $c_p$ [J/(g*K)] was carried out by means of heat flow differential calorimetry using a NETZSCH-DSC 204 Phoenix® apparatus.

In addition, a determination of the density ρ [g/$cm^3$] of the sample was carried out at 23° C. by means of the buoyancy method using the ME235 Sartorius balance together with the YDK 01 density determination set.

From this, the thermal conductivity λ [W/(m*K)] was calculated using the following formula:

$$\lambda = \rho * c_p * a$$

with a $[m^2/s]$ $\rho\,[kg/m^3]$ $c_p\,[J/(kg * K)]$

There was no temperature-dependent density correction.

TABLE 1

| Temperature | ° C. | 25 | 50 | 75 | 100 | 150 | 200 |
|---|---|---|---|---|---|---|---|
| ρ | g/$cm^3$ | 1.244 | 1.244 | 1.244 | 1.244 | 1.244 | 1.244 |
| a | $mm^2$/s | 0.280 | 0.272 | 0.266 | 0.260 | 0.252 | 0.243 |
| $c_p$ | J/(g*K) | 0.831 | 0.880 | 0.926 | 0.969 | 1.047 | 1.110 |
| λ | W/(m*K) | 0.29 | 0.30 | 0.31 | 0.31 | 0.33 | 0.34 |
| Temperature | ° C. | 250 | 300 | 350 | 400 | 450 | 500 |
| ρ | g/$cm^3$ | 1.244 | 1.244 | 1.244 | 1.244 | 1.244 | 1.244 |
| a | $mm^2$/s | 0.236 | 0.232 | 0.228 | 0.225 | 0.224 | 0.224 |
| $c_p$ | J/(g*K) | 1.163 | 1.205 | 1.242 | 1.273 | 1.298 | 1.301 |
| λ | W/(m*K) | 0.34 | 0.35 | 0.35 | 0.36 | 0.36 | 0.36 |

The invention claimed is:

1. A piston for an internal combustion engine, comprising:

a piston crown having an outer surface; and a thermal management layer containing a functional layer, wherein the functional layer contains a functional layer matrix including a polysiloxane and hollow spheres embedded in the functional layer matrix;

wherein a thermal conductivity of the functional layer is 0.2 to 2 W/(m*K); and wherein a heat penetration coefficient of the functional layer is 400 to 1200 J/(K*$m^2$*$s^{1/2}$).

2. The piston according to claim 1, wherein the piston includes a piston material with an aluminum alloy or an iron alloy and the thermal management layer is arranged at least in some areas on the outer surface of the piston crown.

3. The piston according to claim 1, wherein the polysiloxane exhibits a temperature resistance of at least 500° C.

4. The piston according to claim 1, wherein a proportion of hollow spheres in relation to a total volume of the functional layer is 5 to 40 vol-%.

5. The piston according to claim 1, wherein the hollow spheres consist of $SiO_2$ and are embedded in the functional layer as a filler.

6. The piston according to claim 1, wherein the hollow spheres consist of soda-lime borosilicate glass and are embedded in the functional layer as a filler.

7. The piston according to claim 1, wherein the hollow spheres have a diameter of 5 to 50 μm.

8. The piston according to claim 1, wherein the functional layer includes $TiO_2$, $ZrO_2$, and $WO_3$.

9. The piston according to claim 1, wherein the thermal conductivity of the functional layer is 0.2 to 1.8 W/(m*K).

10. The piston according to claim 1, wherein the heat penetration coefficient of the functional layer is 500 to 900 J/(K*$m^2$*$s^{1/2}$).

11. The piston according to claim 1, wherein a specific heat capacity of the functional layer is 450 to 1000 J/(kg*K).

12. The piston according to claim 1, wherein the functional layer has a thickness of 50 to 250 μm measured perpendicular to the outer surface of the piston crown.

13. The piston according to claim 1, wherein the functional layer has a thickness of 50 to 110 μm, measured perpendicular to the outer surface of the piston crown.

14. The piston according to claim 1, wherein the functional layer has a thickness of 50 to 110 μm, measured perpendicular to the outer surface of the piston crown, and the heat penetration coefficient of the functional layer is 500 to 900 $J/(K*m^2*s^{1/2})$.

15. The piston according to claim 1, wherein the thermal management layer further includes a cover layer, wherein the cover layer is attached to the functional layer facing away from the piston crown and consists of a polysiloxane.

16. The piston according to claim 15, wherein the cover layer has a thickness of 4 to 20 μm measured perpendicular to the outer surface of the piston crown.

17. The piston according to claim 1, wherein a surface roughness of the thermal management layer is less than 2 μm.

18. A piston, comprising:

a piston crown having an outer surface; and a thermal management layer including a functional layer and a cover layer, wherein the functional layer includes a functional layer matrix including polysiloxane and embedded hollow spheres;

wherein the cover layer is attached to the functional layer facing away from the piston crown and includes polysiloxane;

wherein a thermal conductivity of the functional layer is 0.3 to 0.4 W/(m*K);

wherein a heat penetration coefficient of the functional layer is 600 to 760 $J/(K*m^2*s^{1/2})$; and wherein a specific heat capacity of the functional layer is 450 to 1000 J/(kg*K).

* * * * *